United States Patent [19]
Yamamura et al.

[11] Patent Number: 5,264,178
[45] Date of Patent: Nov. 23, 1993

[54] BLOW MOLDING METHOD FOR MANUFACTURING A HOLLOW SYNTHETIC RESIN PRODUCT USING A PARISON GUIDE

[75] Inventors: Michio Yamamura; Naoki Ohmori, both of Nishinomiya, Japan

[73] Assignee: Tigers Polymer Corporation, Japan

[21] Appl. No.: 883,959

[22] Filed: May 15, 1992

Related U.S. Application Data

[62] Division of Ser. No. 623,673, Dec. 6, 1990.

[30] Foreign Application Priority Data

Sep. 27, 1990 [JP] Japan .................................. 2-259848

[51] Int. Cl.$^5$ ............................................. B29C 49/04
[52] U.S. Cl. ................................... 264/531; 264/540; 425/531; 425/532
[58] Field of Search ............... 264/531, 540, 150, 151, 264/40.1, 40.7, 209.3, 285, 339; 425/531, 532, 150

[56] References Cited

U.S. PATENT DOCUMENTS

| | | | |
|---|---|---|---|
| 4,239,474 | 12/1980 | Nakagawa | 264/540 |
| 4,738,612 | 4/1988 | Kikuchi et al. | 425/532 |
| 5,030,083 | 7/1991 | Kohno et al. | 425/532 |

FOREIGN PATENT DOCUMENTS

| | | | |
|---|---|---|---|
| 55-021239 | 2/1980 | Japan | 264/540 |
| 55-021240 | 2/1980 | Japan | 264/540 |

*Primary Examiner*—Catherine Timm
*Attorney, Agent, or Firm*—Wegner, Cantor, Mueller & Player

[57] ABSTRACT

The method includes moving a parison guide and a lower molding portion to substantially vertically align an extruding head, the parison guide and an end of the lower molding portion. Then, the lower molding portion is moved substantially horizontally while extruding a parison from the extruding head, while the parison guide is moved laterally in a direction crossing the moving direction of the lower molding portion in accordance with a shape of a groove of the lower molding portion to accommodate a first portion of the parison in the groove. Subsequently, the parison is cut into a predetermined length when the predetermined length thereof is extruded, while a portion of the parison to be cut is held by a parison pinch. Finally, the parison guide is moved laterally in a direction crossing the moving direction of the lower molding portion in accordance with the shape of the groove while moving the lower molding portion substantially horizontally as the parison pinch is lowered gradually to accommodate a second portion of the parison in the groove.

8 Claims, 12 Drawing Sheets

BLOW MOLDING METHOD FOR MANUFACTURING A HOLLOW SYNTHETIC RESIN PRODUCT USING A PARISON GUIDE

This application is a divisional of Ser. No. 07/623,673, filed Dec. 6, 1990.

BACKGROUND OF THE INVENTION (1) Field of the Invention

This invention relates to a method of manufacturing a parison extruded from an extruding head into a hollow synthetic resin product which is bent two- or three-dimensionally by using a molding device and to an apparatus for manufacturing the above product.

(2) Description of the Prior Art

Figure 1:
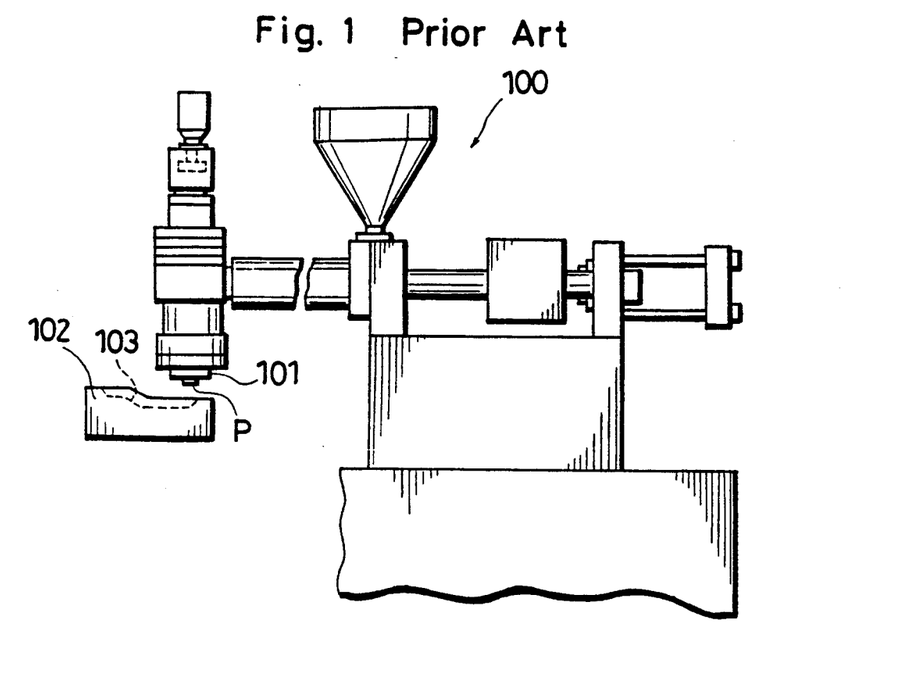
FIGS. 1 and 2 show an apparatus used for a conventional method for manufacturing a hollow synthetic resin product.

FIG. 1 shows an apparatus used for a conventional method for manufacturing a hollow synthetic resin product. The apparatus comprises an extruding head 101 attached to an extruder 100 and a molding device comprising a lower molding portion 102 provided below the extruding head 101 and an upper molding portion (not shown). The hollow synthetic resin product is produced by 1) the lower molding portion 102 is horizontally moved against the extruding head 101, 2) a parison P is extruded from the head 101 and is accommodated in a groove 103 of the lower molding portion 102, 3) the upper molding portion is put on the lower molding portion 102 for molding, and then 4) a compressed air is blown into the parison P.

The above method, however, has the following problem. Since the groove 103 is generally curved as shown in FIG. 2, the molding device, which is heavy, should be moved horizontally, which requires a complicated moving mechanism and enlarges the apparatus.

Figures 2, 3:
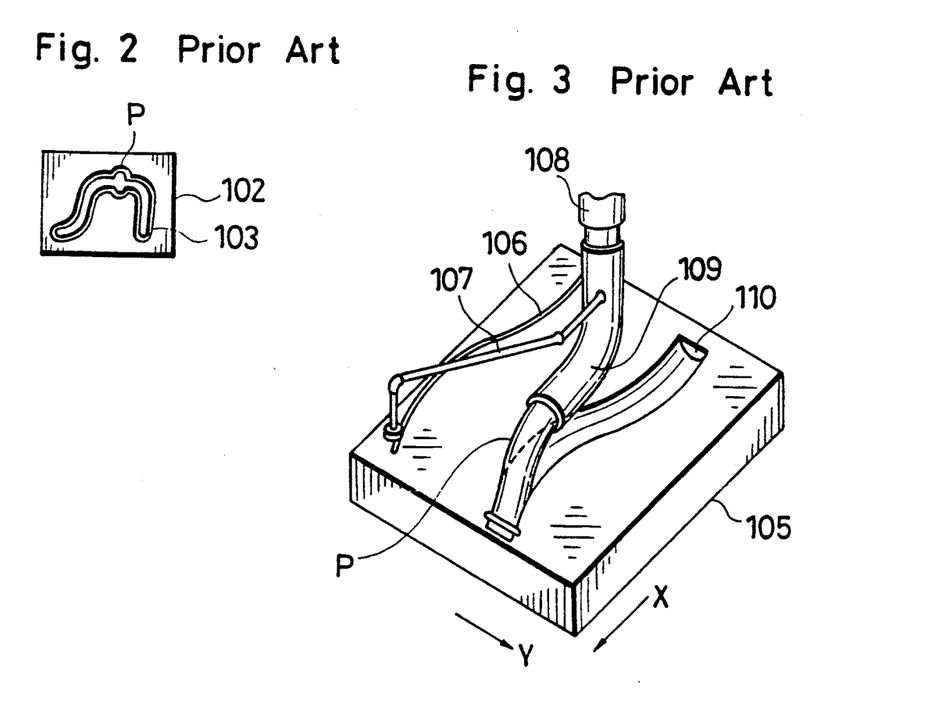
FIG. 3 shows another apparatus used for another conventional method for manufacturing the hollow synthetic resin product.

The above problem can be solved by a method shown in FIG. 3 (Japanese Patent Publication 2-117810). A lower molding portion 105 is moved in an X direction. A sub-groove 106 curved in the same way as the product to manufacture and a rod 107 are used in combination to swing a curved cylinder 109 in a Y direction perpendicular to the X direction, the curved cylinder 109 being attached to an opening of an extruding head 108. In this way, the parison P is accommodated in a groove 110 of the lower molding portion 105.

However, this method also involves a problem. If the groove 110 is curved sharply, for example, almost perpendicularly, the rod 107 is stuck at a corner of a corresponding curve of the sub-groove 106.

This problem can be solved by employing another cylinder which swings in the Y direction while holding the curved cylinder 109 instead of employing the sub-groove 106 and the rod 107. This construction requires the curved cylinder 109 to be close to the lower molding portion 105 to ease the accommodation. In such construction, however, the parison P is accommodated in the state of being twisted, whereby swelling the product partially. The swelling portion is easy to crack.

The swelling of the parison P is prevented by rotating a nozzle of the extruding head 101 around a vertical axis thereof in addition to moving the lower molding portion 105 horizontally. However, friction of the nozzle and a nozzle supporting portion prevents smooth rotation of the nozzle and finally completely unables the rotation.

SUMMARY OF THE INVENTION

Accordingly, this invention has an object of offering a manufacturing method of a hollow synthetic resin product which prevents enlargement of an apparatus for manufacturing the above product and allows smooth and uniform accommodation of a parison in a groove of a lower molding portion.

Another object of this invention is to offer a manufacturing method of a hollow synthetic resin product which prevents the parison to be swollen without using a mechanism for rotating a nozzle of a parison extruding head.

Still another object of this invention is to offer an apparatus for realizing the above manufacturing method in a rational way.

The above objects are fulfilled by a method of manufacturing a hollow synthetic resin product, comprising the steps of extruding a parison from an extruding head vertically downward; moving a lower molding portion straight in a direction crossing the extruding direction of the parison in association with the extruding of the parison; guiding the parison in a direction crossing the moving direction of the lower molding portion in accordance with a shape of a groove of the lower molding portion and accommodating a first portion of the parison in the groove in association with the movement of the lower molding portion; cutting the parison into a predetermined length when the predetermined length thereof is extruded; holding a portion of the parison to be cut by a parison pinch immediately before the parison is cut; and guiding the parison held by the parison pinch in a direction crossing the moving direction of the lower molding portion in accordance with the shape of the groove while gradually lowering the parison, and accommodating a second portion of the parison in the groove.

In the step of guiding the parison held by the parison pinch, the parison pinch may rotate the parison in a first direction in accordance with a curve of the groove when the parison is being accommodated in the curve and rotate the parison in a second direction opposite to the first direction after the parison passes the curve.

The lower molding portion may be controlled to move at a high speed when the parison is being accommodated in the groove in parallel with the moving direction of the lower molding portion and to move at a low speed when the parison is being accommodated in the groove in a direction crossing the moving direction of the lower molding portion.

The above method may further comprise the steps of moving the lower molding portion to a position where the lower molding portion is opposed to an upper molding portion after the parison is completely accommodated in the groove; and molding the parison by assembling the upper molding portion and the lower molding portion and inserting a gas into the parison.

The above objects are also fulfilled by a method of manufacturing a hollow synthetic resin product, comprising the steps of moving a parison guide and a lower molding portion to aligning an extruding head, the parison guide and an end of the lower molding portion on a perpendicular plane; moving the lower molding portion straight in a direction perpendicular to the perpendicular plane while extruding a parison from the extruding head, and moving the parison guide in a direction crossing the moving direction of the lower molding portion in accordance with a shape of a groove of the lower molding portion to accommodate a first portion of the parison in the groove; cutting the parison into a predetermined length when the predetermined length thereof is extruded; holding a portion of the parison to be cut by a parison pinch immediately before the parison is cut; and moving the parison guide in a direction crossing the moving direction of the lower molding portion in accordance with the shape of the groove while moving the lower molding portion straight in the direction perpendicular to the perpendicular plane, and lowering the parison pinch gradually to accommodate a second portion of the parison in the groove.

The above objects are also fulfilled by an apparatus for manufacturing a hollow synthetic resin product, the apparatus comprising at least a pair of upper molding portion having a curved upper groove on a bottom surface thereof and lower molding portion having a curved lower groove on a top surface thereof; an extruding head for extruding a parison perpendicularly downward; a lower molding portion moving device for moving the lower molding portion straight in a direction crossing the direction of extruding the parison in association with the extruding of the parison; a parison guiding device for guiding the parison in a direction crossing the moving direction of the lower molding portion in accordance with a shape of the lower groove to accommodate a first portion of the parison in the lower groove in association with the movement of the lower molding portion; a cutting device for cutting the parison into a predetermined length; a parison holding device for holding a portion of the parison to be cut with a parison pinch immediately before the parison is cut, for lowering an upper end of the above portion of the parison in progress with the accommodation of the parison, and then for releasing the upper end of the parison; and a control device for executing overall control of the lower molding portion moving device, the parison guiding device, and the parison holding device.

The lower molding portion moving device may be controlled by the control device to move the lower molding portion at a high speed when the parison is being accommodated in the lower groove in parallel with the moving direction of the lower molding portion and to move at a low speed when the parison is being accommodated in the lower groove in a direction crossing the moving direction of the lower molding portion.

The control device may control the lower molding portion moving device, the parison guiding device and the parison holding device so that the parison is accommodated in the lower groove throughout a total length thereof at a substantially uniform speed.

The parison holding device may include a mechanism for rotating the parison in a first direction in accordance with a curve of the lower groove when the parison is being accommodated in the curve and rotating the parison in a second direction opposite to the first direction after the parison passes the curve.

The parison holding device may comprise a robot having a mechanism which is movable three-dimensionally to an arbitrary position and a holding member for holding the parison, the holding member being attached to the mechanism.

The parison guiding device may comprise a robot having a mechanism which is movable to an arbitrary position and a guiding member attached to the mechanism, the guiding member comprising four lengthy rollers arranged in parallel crosses, into whose hole the parison is to be inserted.

The upper and lower molding portions may be provided in two pairs, the lower molding portions each being movable reciprocatingly between a first position below the extruding head and a second position below the corresponding upper molding portion, the first position being common to the two lower molding portions, and the parison may be accommodated in the lower groove of one of the lower molding portions at the first position while the other lower molding portion is covered with the corresponding upper molding portion for molding at the corresponding second position.

The above objects are also fulfilled by an apparatus for manufacturing a hollow synthetic resin product, the apparatus comprising at least a pair of upper molding portion having a curved upper curve on a bottom surface thereof and lower molding portion having a curved lower groove on a top surface thereof; a lower molding portion carrying device for moving reciprocatingly the lower molding portion between a parison accommodating position and another position below the upper molding portion; an extruding head provided above the lower molding portion placed at the parison accommodating position, the distance between the extruding head and the lower molding portion being shorter than a total length of the lower groove; a cutting device for cutting the parison into a predetermined length, the predetermined length being related to the total length of the lower groove; a parison holding device for holding a portion of the parison to be cut immediately before the parison is cut; a parison guiding device for guiding the parison in a direction crossing the moving direction of the lower molding portion in accordance with a shape of the lower groove to accommodate a first portion of the parison in a first portion of the lower groove until the parison is cut, and for guiding a second portion of the parison to be accommodated in a second portion of the lower groove in cooperation with the parison holding device after the parison is cut; and a lower molding portion movement control device for controlling the lower molding portion carrying device to move the lower molding portion in association with the extruding of the parison when the lower molding portion is at the parison accommodating position before the parison is cut and to move the lower molding portion in association with the movement of the parison holding device after the parison is cut.

The lower molding portion movement control device may control the lower molding portion carrying device to move the lower molding portion at a high speed when the parison is being accommodated in the lower groove in parallel with the moving direction of the lower moving portion and to move the lower molding portion at a low speed when the parison is being accommodated in the lower groove in a direction crossing the moving direction of the lower molding portion.

According to the above method and construction, the lower molding portion is moved while the parison is extruded from the extruding head. Simultaneously, the parison is guided by the parison guide. In this way, the first portion of the parison is gradually accommodated in the groove of the lower molding portion. When the parison is extruded in a predetermined length, the parison is cut and the parison is held by the parison pinch while the parison guide is moved in association with the parison pinch. In this way, the second portion of the parison is gradually accommodated in the groove.

According to this invention, the parison is accommodated mainly by the movement of the lower molding portion, the parison guide, and the parison pinch. The distance between the lower molding portion and the extruding head is short. There is no need for rotating the extruding head or for moving the heavy molding device. As a result, the hollow synthetic resin product can be manufactured with a compact apparatus.

Even if the groove has a sharp curve, the parison can be accommodated without twisted by locating the sharp curve at an appropriate position so that the parison is accommodated in the curve after being cut and by providing the parison pinch with a rotatable mechanism. Since the mechanism rotates the parison in accordance with the curve of the groove, the parison is kept to be directed in the same direction with the curve of the groove.

Since the parison is prevented from swelling in the above way, the finished product has no cracks. As a result, quality of the products is improved and deficiency rate is lowered. Moreover, the swelling of the parison is prevented by the rotation of the parison pinch, not by the rotation of the nozzle, the conventional problem of friction between the nozzle and the nozzle supporting portion does not occur.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF A PREFERRED EMBODIMENT Overall construction of apparatus

Figure 4:
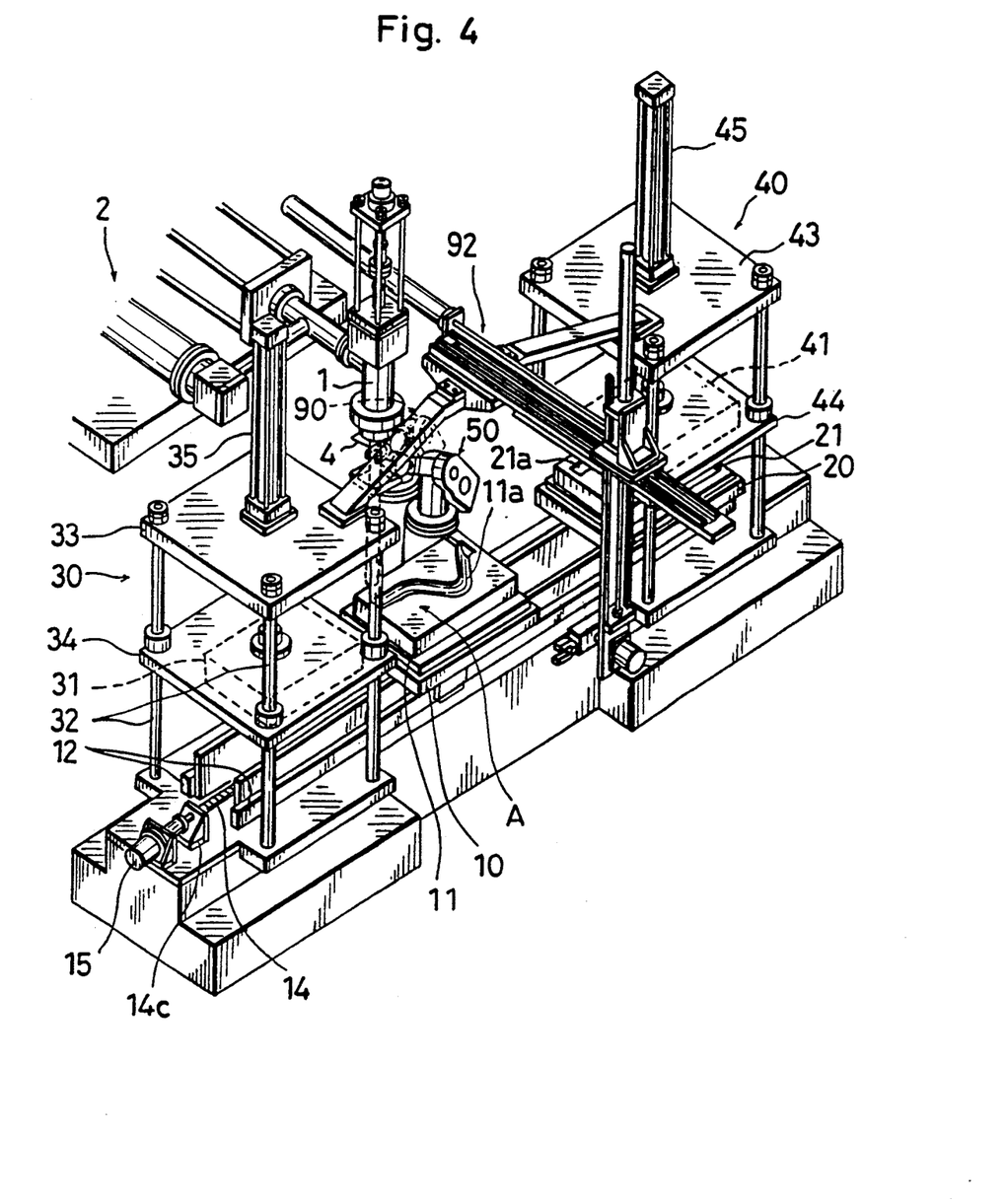
FIG. 4 is a perspective view of an apparatus according to this invention.
Figure 5:
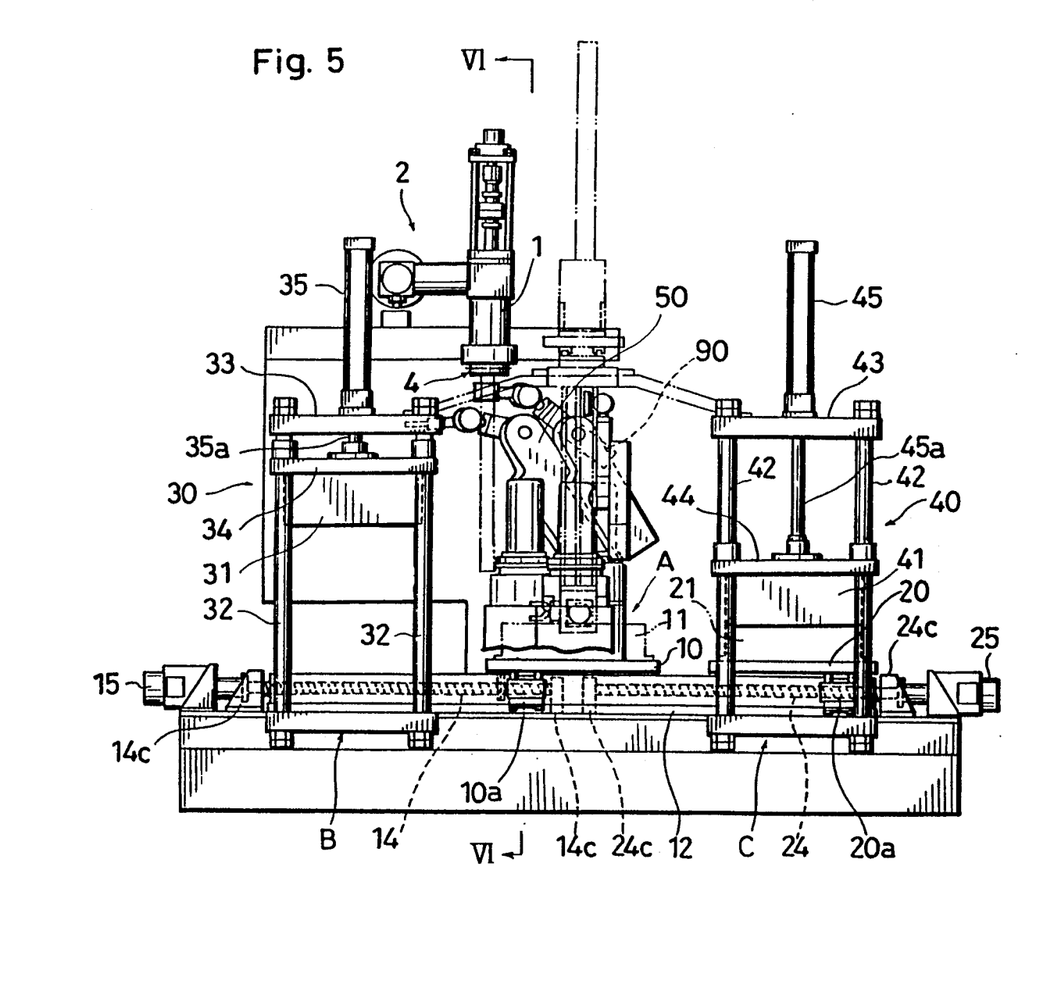
FIG. 5 is a front view thereof.

An apparatus for manufacturing a hollow synthetic resin product according to this invention will be described referring to FIGS. 4 through 6.

The apparatus comprises an extruder 2; a cylindrical extruding head 1, from which a parison P is to be extruded, the head 1 being fixed at a tip of the extruder 2 and having a non-rotatable nozzle thereof at a lower end thereof; molding devices 30 and 40 provided to the left and the right (FIG. 5) of the head 1; a carriage 10 moving between the molding device 30 and a parison accommodating position A below the head 1; another carriage 20 moving between the molding device 40 and the parison accommodating position A; lower molding portions 11 and 21 respectively mounted on the carriages 10 and 20; and upper molding portions 31 and 41 respectively attached on the molding devices 30 and 40, the upper molding portions 31 and 41 being to be lowered when the lower molding portions 11 and 21 are at molding positions B and C, respectively. Provided below the head 1 is a parison guide 50 for guiding the parison P which has been extruded from the head 1; and provided to the left of the parison guide 50 is a parison pinch 90 for holding the parison P which has been cut. 92 refers to an automatic takeout device for taking the completed hollow synthetic resin product from the lower molding portions 11 or 21.

Extruder 2

Figure 6:
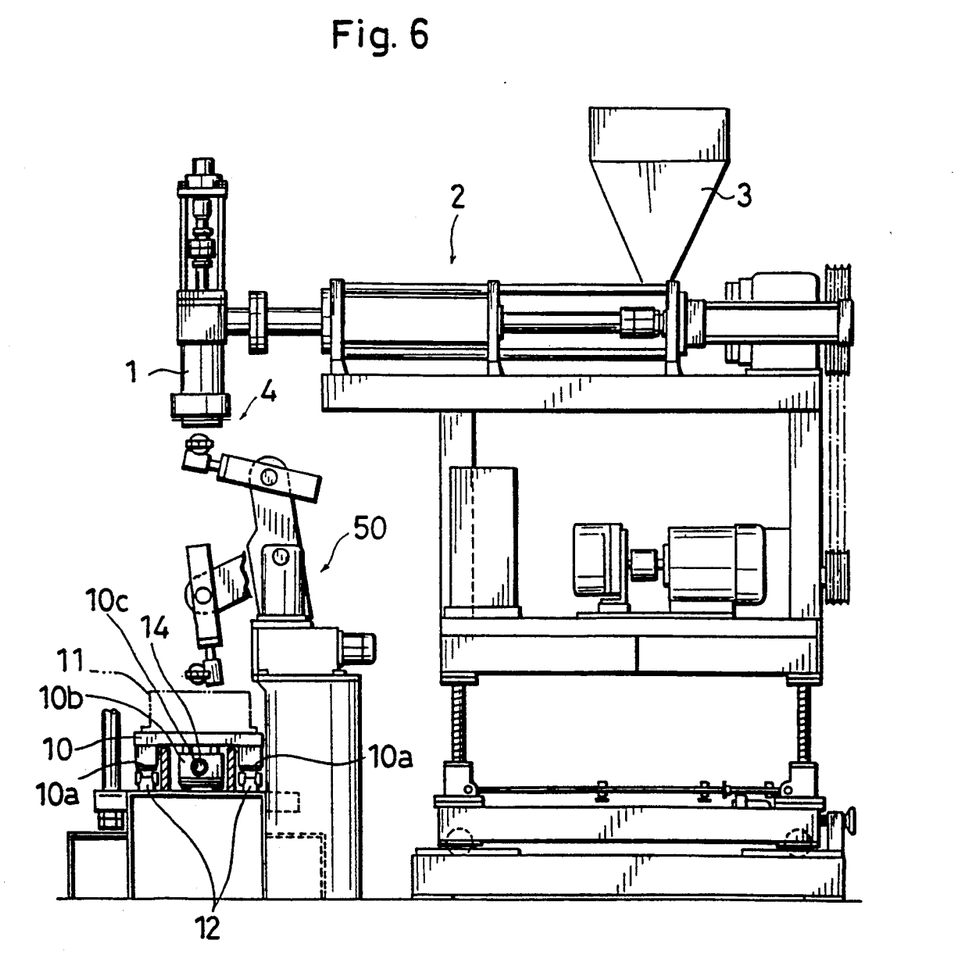
FIG. 6 is a cross sectional view of the embodiment taken along the line VI—VI of FIG. 5.

As shown in FIG. 6, the extruder 2 has a hopper 3 for accommodating a synthetic resin as a material for the parison P, which is melted and extruded from the head 1 in a specific length. Although the extruder 2 is of the accumulator-type in this embodiment, it may be of other types. The extruder 2 also has a built-in temperature adjuster (not shown) for melting the synthetic resin and for keeping it at a certain temperature and a measuring device (not shown) for measuring a length of the parison P to be extruded. The length of the parison P to be extruded is determined by a length of a groove 11a or 21a of the lower molding portion 11 or 21, by a weight of the product to manufacture and the like.

Figure 7:
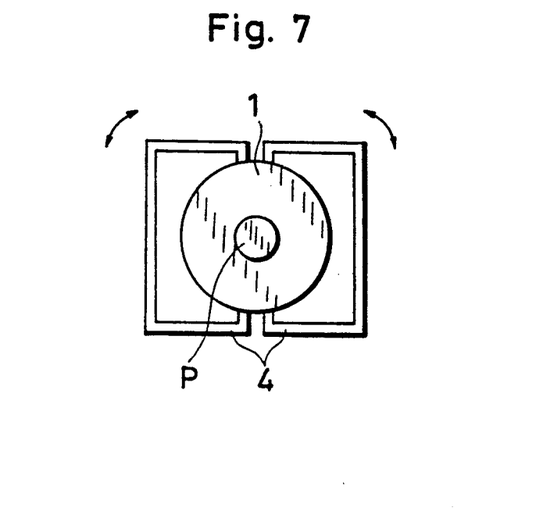
FIG. 7 is a bottom view of a cutter.

The extruding head 1 has a cylindrical thickness adjuster (not shown) included therein concentrically for hollowing the parison P and for adjusting a thickness thereof before the parison P is extruded. At a lower tip of the nozzle is a cutter 4 comprising two blades for cutting the parison P into a specified length by closing the blades in an arc (FIG. 7).

Carriages 10 and 20

The carriages 10 and 20 are slidable on a pair of rails 12 extended between the molding devices 30 and 40, whereby carrying the lower molding portions 11 and 21, respectively.

The carriages 10 and 20 are each slidable due to the following mechanism.

The carriage 10 has a roller bearing 10a and an engaging member 10b having a female thread 10c attached on a bottom surface of the carriage 10. On the other hand, a male-threaded shaft 14 is rotatably extended between the parison accommodating position A and the molding device 30. The shaft 14 is screwed into the engaging member 10b, whereby moving the carriage 10 when driven by a driving motor 15. 14c refers to supporting members for supporting the male-threaded shaft 14.

The carriage 20 has a roller bearing 20a and an engaging member 20b having a female thread 20c attached on a bottom surface of the carriage 20. On the other hand, a male-threaded shaft 24 is rotatably extended between the parison accommodating position A and the molding device 40. The shaft 24 is screwed into the engaging member 20b, whereby moving the carriage 20 when driven by a driving motor 25. 24c refers to supporting members for supporting the male-threaded shaft 24.

Molding devices 30 and 40

The molding devices 30 and 40, which are respectively for covering the lower molding portions 11 and 21 with the upper molding portions 31 and 41 and for molding the parison P, each have the following construction.

The molding device 30 comprises four supporting rods 32, two of them standing opposed to the other two with the rails 12 therebetween. The supporting rods 32 are extended through a rectangular plate 34 at four corners thereof, whereby the plate 34 is vertically movable. Upper ends of the supporting rods 32 are bolted on a top plate 33 at four corners thereof, the top plate 33 having substantially the same size with the plate 34.

A hydraulic cylinder 35 stands on the top plate 33, a cylinder rod 35a of the cylinder 35 being extended through the top plate 33 and being attached on an upper surface of the plate 34. In this construction, the plate 34 is vertically movable by the hydraulic cylinder 35 while being guided by the supporting rods 32.

The molding device 40 comprises four supporting rods 42, two of them standing opposed to the other two with the rails 12 therebetween. The supporting rods 42 are extended through a rectangular plate 44 at four corners thereof, whereby the plate 44 is vertically movable. Upper ends of the supporting rods 42 are bolted on a top plate 43 at four corners thereof, the top plate 43 having substantially the same size with the plate 44.

A hydraulic cylinder 45 stands on the top plate 43, a cylinder rod 45a of the cylinder 45 being extended through the top plate 43 and being attached on an upper surface of the plate 44. In this construction, the plate 44 is vertically movable by the hydraulic cylinder 45 while being guided by the supporting rods 42.

On backs of the molding devices 30 and 40 are nozzle inserting devices (not shown) for inserting the nozzle of the head 1 into the parison P and thus blowing a gas such as a compressed air from the nozzle to inflate the parison P.

Parison guide 50 and parison pinch 90

Figure 8:
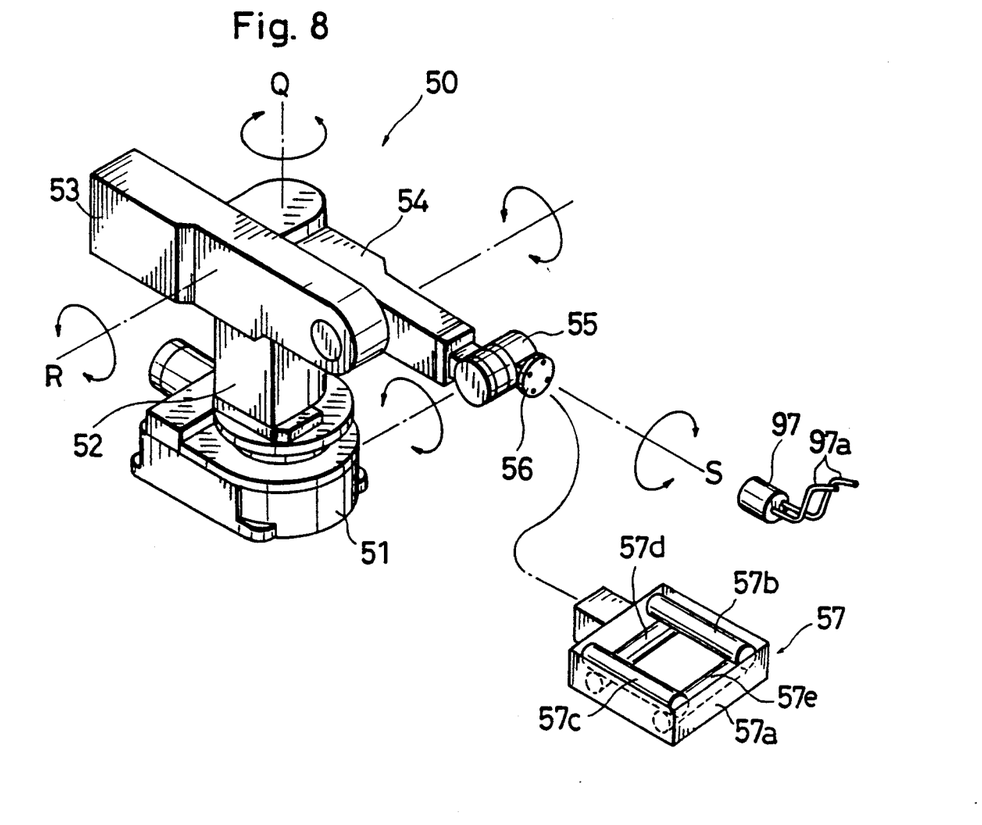
FIG. 8 is a perspective view of a main part of a parison guide with first and second guiding hands.

As shown in FIG. 8, the parison guide 50 and the parison pinch 90 are robots having mechanisms which are movable to arbitrary positions three-dimensionally. The parison guide 50 has a first guiding hand 57 for guiding the parison P which has been extruded from the extruding head 1. The parison pinch 90 has a second guiding hand 97 for holding the parison P which has been cut.

The parison guide 50 and the parison pinch 90 have the same constructions in their main parts, namely, the parts except the first guiding hand 57 and the second guiding hand 97. The construction of the main parts will be described hereinafter with the parison 50 as an example.

The parison guide 50 comprises a base 51; a supporting pillar 52 provided on the base 51, rotatably around a vertical rotating axis Q; a shoulder 53 supported on an upper side surface of the pillar 52, rotatably around a horizontal rotating axis R running perpendicularly to the axis Q; an arm 54 supported at an end of the shoulder 53, rotatably around an axis running in parallel with the axis R; a wrist 55 supported at an end of the arm 54, rotatably around in a rotating axis running in parallel with the axis R; and a hand attaching member 56 attached at an end of the wrist 55, rotatably around a horizontal rotating axis S running perpendicularly to the axis R.

Figure 9A:
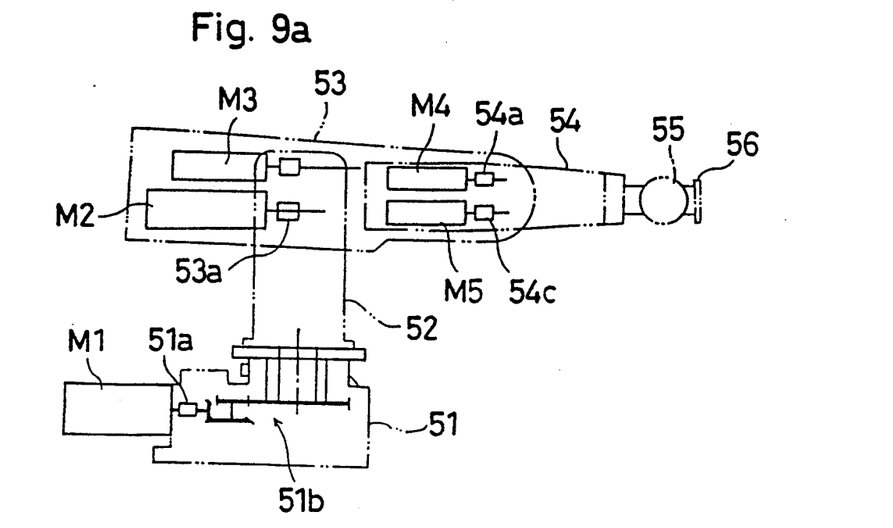
FIG. 9a is a front view of a driving device of a main part of the parison guide.
Figures 9B, 9C:
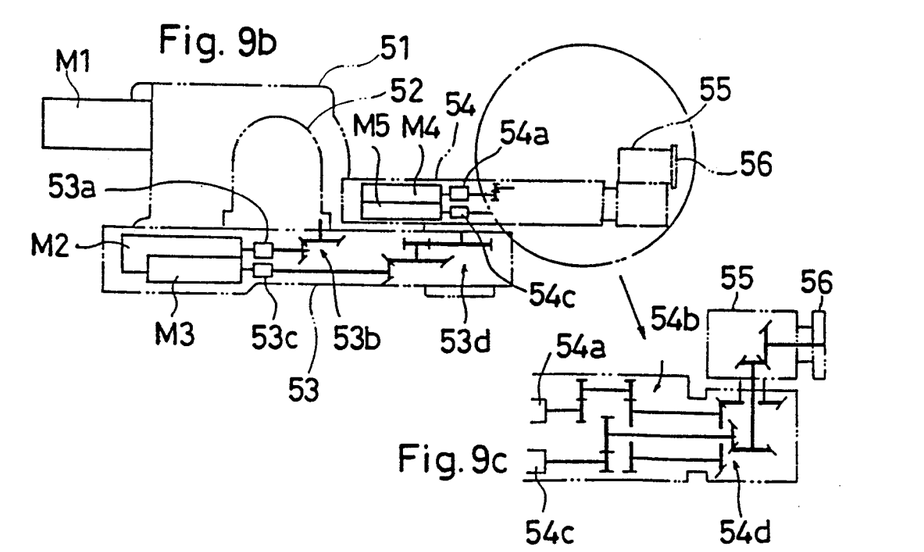
FIG. 9b is a plan view thereof.
FIG. 9c is a partially enlarged view of FIG. 9b.

The main part of the parison guide 50 is operated as shown in FIGS. 9a, 9b and 9c. A rotation of a driving motor M1 included in the base 51 is conveyed to a first gearing mechanism 51b through a coupling 51a, whereby the supporting pillar 52 is rotated. A rotation of a driving motor M2 included in the shoulder 53 is conveyed to a second gearing mechanism 53b through a coupling 53a, whereby the shoulder 53 is rotated. A rotation of a driving motor M3 also included in the shoulder 53 is conveyed to a third gearing mechanism 53d through a coupling 53c, whereby the arm 54 is rotated. A rotation of a driving motor M4 included in the arm 54 is conveyed to a fourth gearing mechanism 54b through a coupling 54a, whereby the wrist 55 is rotated. A rotation of a driving motor M5 also included in the arm 54 is conveyed to a fifth gearing mechanism 54d through a coupling 54c, whereby the hand attaching member 56 is rotated.

As exemplified in FIG. 8, the first guiding hand 57 is attached to the hand attaching member 56.

The main part of the parison pinch 90 is operated in the same manner, and the second guiding hand 97 is attached to a hand attaching member of the parison pinch 90.

Guiding hands 57 and 97

Figure 10:
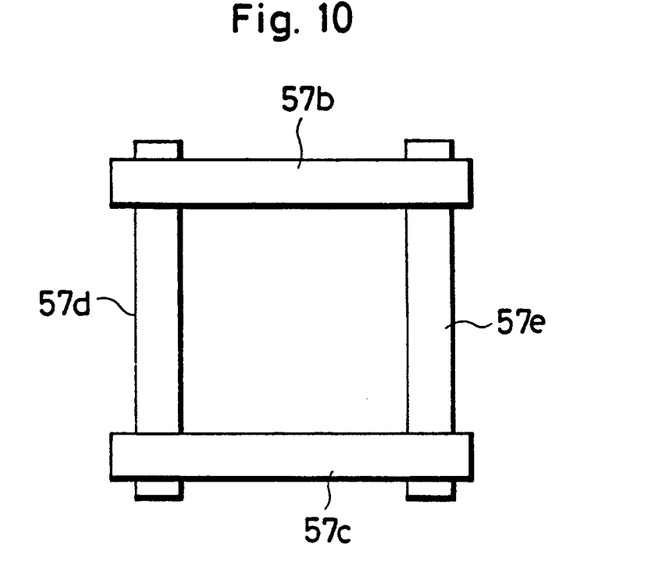
FIG. 10 shows an ideal arrangement of rollers of the first guiding hand.
Figure 11:
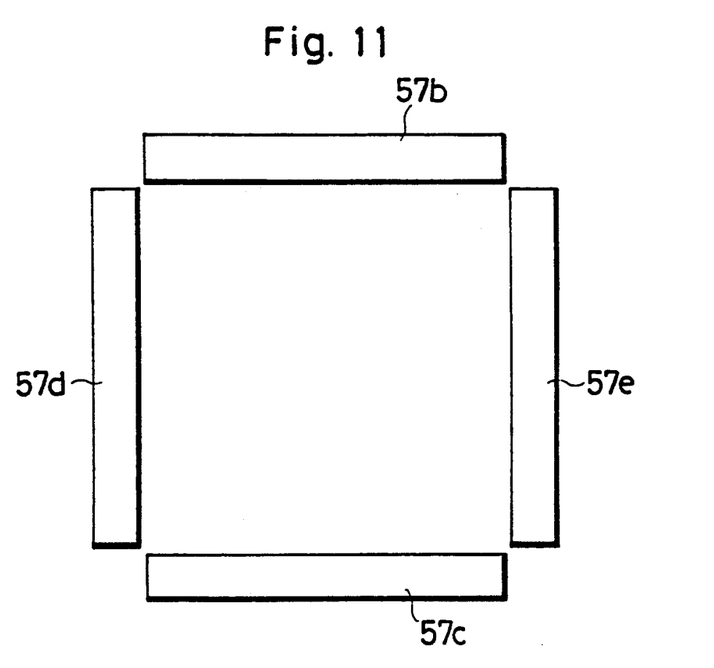
FIG. 11 is a defective arrangement of the above.

The first guiding hand 57 comprises a rectangular case 57a and four rollers 57b through 57e provided in the case 57a, rotatably around axes thereof. As shown in FIG. 10, the rollers 57b through 57e are arranged in parallel crosses. It is desirable that the adjacent two rollers are perpendicular to each other. If the rollers 57b through 57e are apart as in FIG. 12, the parison P is stuck in a gap between the rollers and cannot be guided smoothly.

Figure 12:
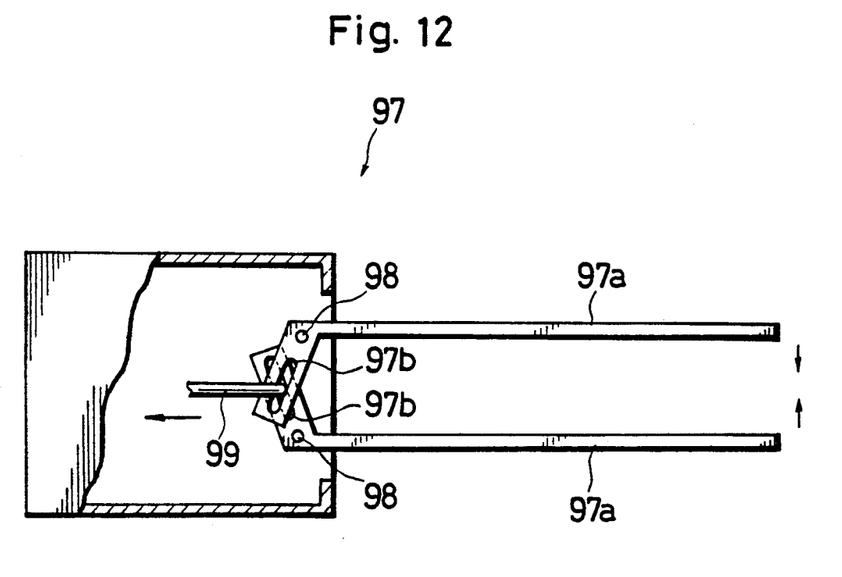
FIG. 12 is a plan view of the second guiding hand.

The second guiding hand 97 is has two fingers 97a. As shown in FIG. 12, the fingers 97a are each pivotally supported at a knuckle thereof by a supporting shaft 98. The fingers 97a also have holes 97b at tip portions thereof, respectively, into which a driving force conveying shaft 99 is inserted. When the shaft 99 is pulled in a direction of an arrow of FIG. 12, the fingers 97a are closed; and when the shaft 99 is pushed in the opposite direction, the fingers 97a are opened.

Control device 60

Figure 13:
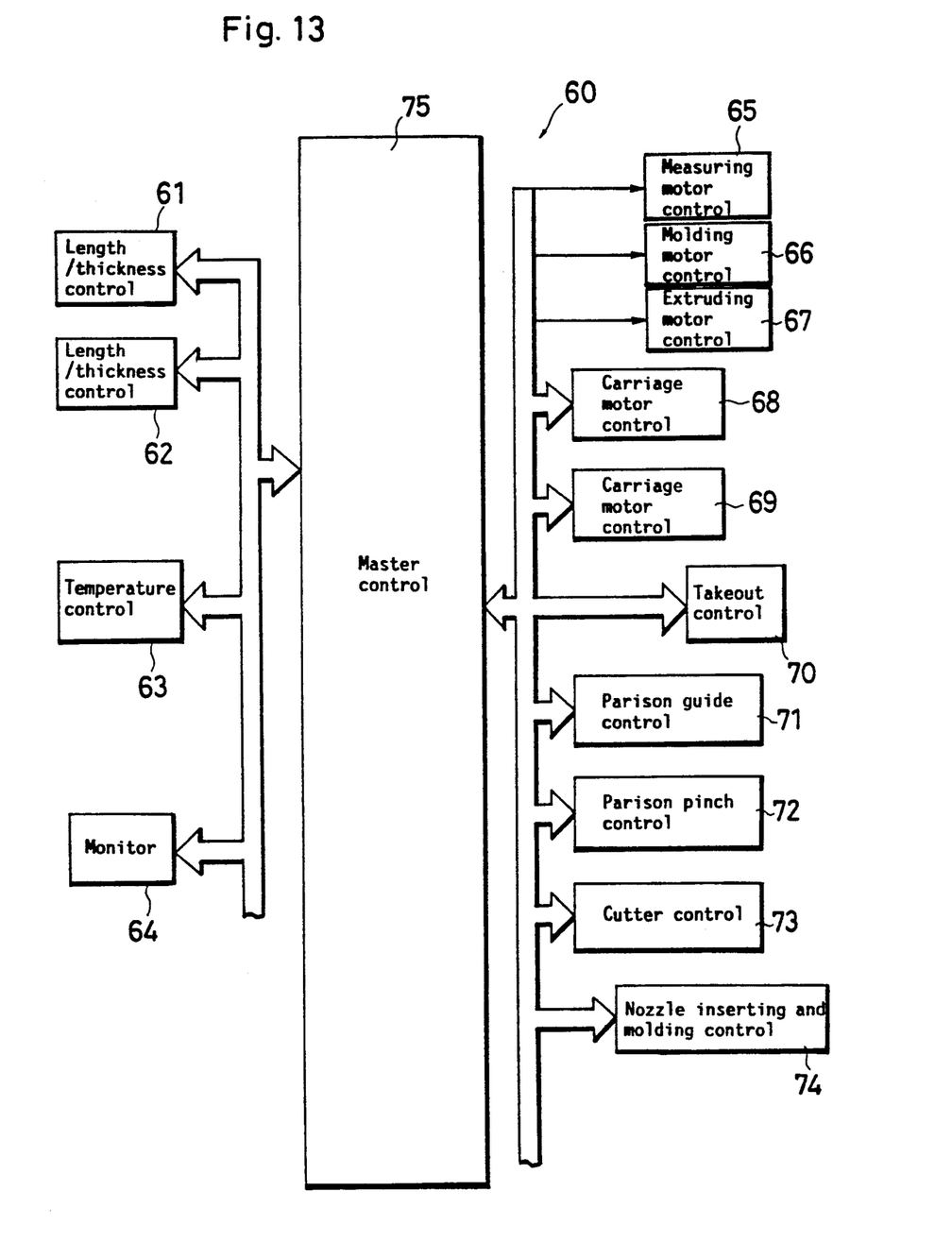
FIG. 13 is a block diagram of a control device.

An operation of the parison guide 50 and the parison pinch 90 are controlled by a control device 60 shown in FIG. 13. The control device 60 comprises two length/-thickness controls 61 and 62 for storing a length of the parison P to be extruded and a thickness of the parison P pitch by pitch (the length of one pitch is predetermined) and for controlling the cylindrical thickness adjuster (not shown) based on the data stored. The control device 60 also comprises a temperature control 63 for controlling the temperature adjuster (not shown); a monitor 64; a measuring motor control 65 for controlling the driving of a parison measuring motor provided in the extruder 2; a molding motor control 66 for controlling the driving of the hydraulic cylinders 35 and 45; and an extruding motor control 67 for controlling the driving of a motor which is provided in the extruding head 1 for extruding the parison P. Further included in the control device 60 are carriage motor controls 68 and 69 respectively for controlling the driving motors 15 and 25 which are used to move the carriages 10 and 20;

a takeout control 70 for controlling the automatic takeout device 92; a parison guide control 71 for controlling the parison guide 50; a parison pinch control 72 for controlling the parison pinch 90; a cutter control 73 for controlling the operation start of the cutter 4; a nozzle inserting and molding control 74 for controlling the molding devices 30 and 40; and a master control 75 for executing transmission of operation start and operation finish signals to and from the above controls. The controls 61, 62, 68, 69, 71, 72 and 73 each involve a CPU (not shown) for storing control data and for executing the controls in accordance with the stored data, and also involve a detecting sensor (not shown) for detecting if the operation is completely started or finished.

Preset in the CPU of the parison guide control 71 are a locus of the first guiding hand 57, a pivoting angle of the first guiding hand 57 at each position on the locus, and operation timing and operation amounts of the motors M1 through M5 for moving and pivoting the first guiding hand 57.

When an operation start signal from the master control 75 is inputted to the CPU of the parison guide control 71, the parison guide 50 is driven as preset. When the driving is finished, it is detected by the detecting sensor that the driving is finished and an operation finish signal is outputted to the master control 75.

Preset in the CPU of the parison pinch control 72 are timing of the parison pinch 90 for holding the parison P which has been cut and a locus of the parison pinch 90. The signals are transmitted between the CPU and the master control 75 in the same manner as above. The other controls are operated in the same way.

Operation

Figure 14:
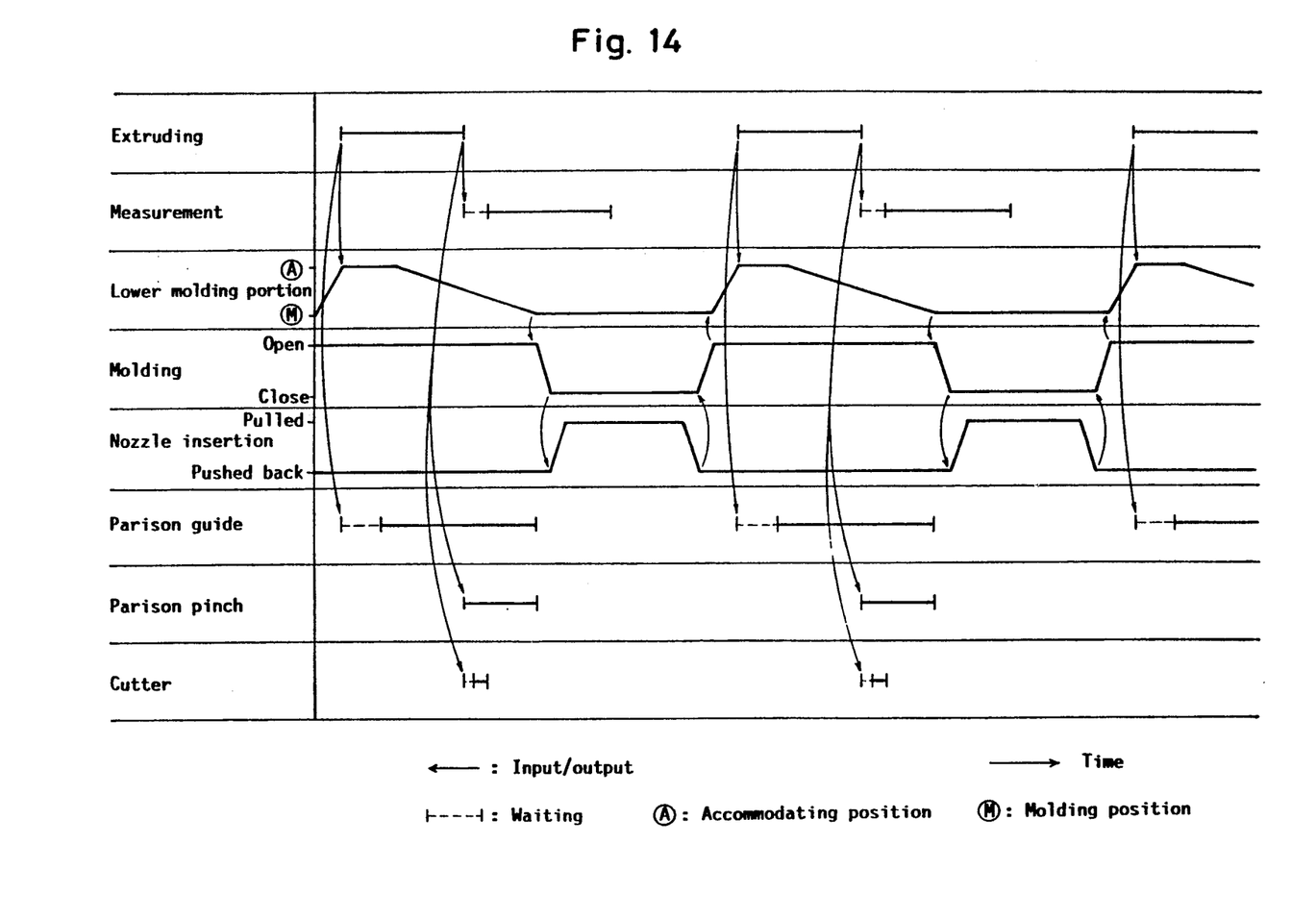
FIG. 14 is a timing chart of an operation of the control device.
Figure 15A:
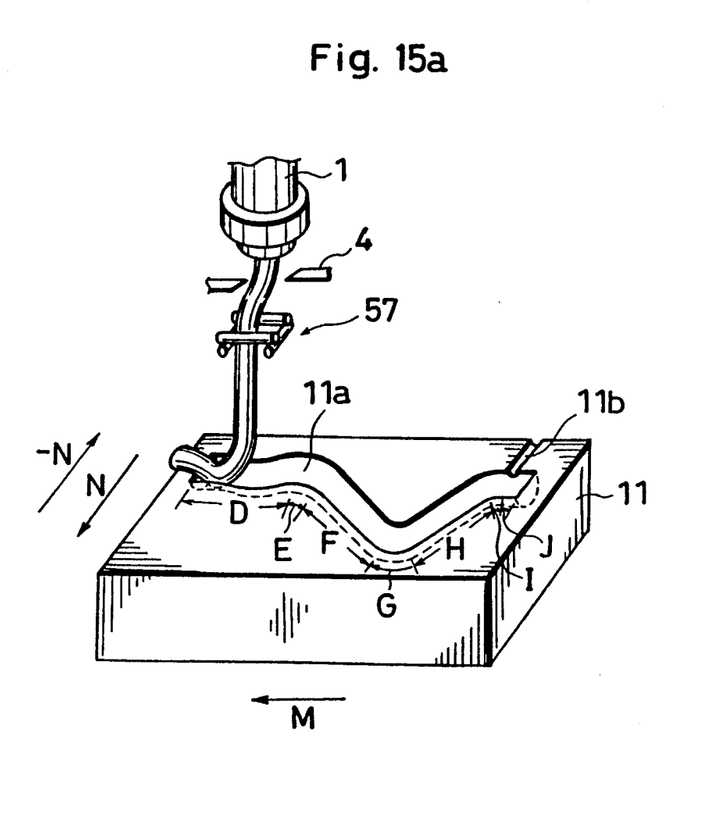
FIG. 15a through 15d illustrate steps of a manufacturing method according to this invention.
Figure 15B:
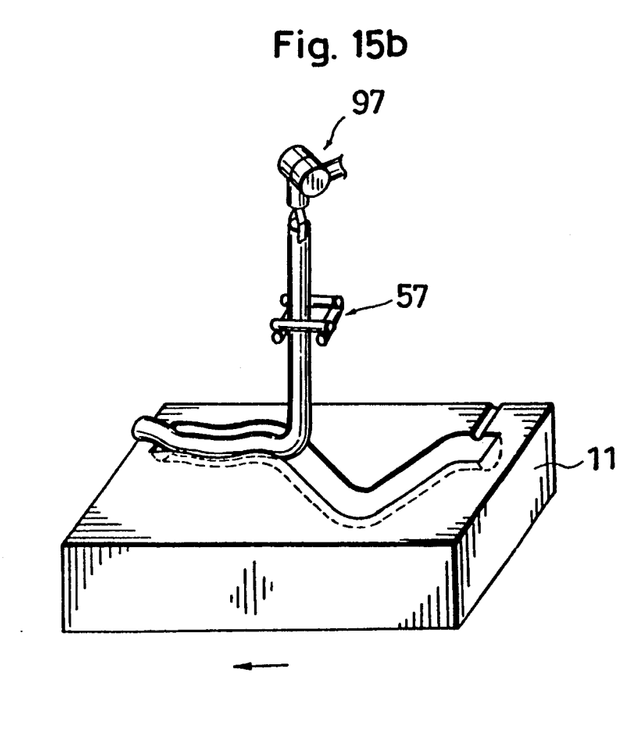

How a hollow synthetic resin product is manufactured with an apparatus having the above construction will be described with reference to FIGS. 14, 15a and 15b. In FIG. 15a, the groove 11a comprises a slowly winding portion D, sharp curves E, G and I, straight portions F and H and a last portion J.

When a predetermined preparation is finished, the control device 60 outputs an operation start signal. Receiving this signal, the carriage motor control 68 controls the driving motor 15 to move the carriage 10 to the parison accommodating position A. The measuring device has already finished measuring the resin by this time and is waiting for the next measurement. The waiting time is preset in the controls 61 and 62.

When the carriage 10 is moved to the position A, the extruding motor control 67 controls the motor in the extruder 2 to extrude the parison P from the head 1. Simultaneously, the parison guide control 71 and the carriage motor control 68 go into the waiting mode. At this time, the first guiding hand 57 is right below the head 1.

After a certain period of time, for example, 5 seconds, the parison guide control 71 and the carriage motor control 68 goes into the operation mode. In detail, the carriage motor control 68 controls the driving motor 15 to move the carriage 10 (namely, the lower molding portion 11) from the position A toward the molding device 30 (M direction). The parison guide control 71 start moving the first guiding hand 57 in a direction crossing the M direction (N or −N direction). It should be noted that the lower molding portion 11 keeps moving while the parison P is accommodated in the groove 11a, but that the first guiding hand 57 moves only when necessary in accordance with how the groove 11a is wound. By the time the parison guide control 71 and the carriage motor control 68 goes into the operation mode, the parison P has been inserted through the first guiding hand 57 and a leading tip of the parison P has been dropped on the vicinity of an end of the groove 11a from which the parison P is to be accommodated.

The parison P is accommodated from the portion D toward the last portion J. The first guiding hand 57 moves in the N and −N directions alternately while pivoting in accordance with the slowly winding portion D, whereby accommodating the parison P therein. Since the portion D runs substantially in parallel with the M direction, the lower molding portion 11 is controlled to move at a high speed. During the accommodation in the portion D, the predetermined length of parison P is extruded and cut by the cutter 4. Immediately before the parison P is cut, the second guiding hand 97 holds the parison P at a portion immediately below the cutter 4.

When the parison P is about to reach the sharp curve E, the second guiding hand 97 rotates the parison P in such a direction that the parison P is accommodated without being twisted. Upon passing the curve E, the second guiding hand 97 rotates the parison P back in the opposite direction.

When the parison P is about to reach the straight portion F, the moving speed of the lower molding portion 11 is lowered since the portions F through I are not in parallel with the M direction. The first guiding hand 57 moves in the N direction, whereby accommodating the parison P in the portion F.

When the parison P is about reach the sharp curve G, the second guiding hand 97 rotates the parison P in such a direction that the parison P is accommodated without being twisted. Upon passing the curve G, the second guiding hand 97 rotates the parison P back in the opposite direction.

When the parison P is about to reach the straight portion H, the first guiding hand 57 moves in the −N direction, whereby accommodating the parison P in the portion H.

When the parison P is about reach the sharp curve I, the second guiding hand 97 rotates the parison P in such a direction that the parison P is accommodated without being twisted. Upon passing the curve I, the second guiding hand 97 rotates the parison P back in the opposite direction and then releases the parison P.

When the parison P is about to reach the last portion J, the first guiding hand 57 is lowered to accommodate the parison P in the portion J.

If the predetermined length of the parison P is longer than the total length of the groove 11a, the accommodation in the portion J may be guided by the second guiding hand 97.

As has been described so far, the movement of the lower molding portion 11, the first guiding hand 57 and the second guiding hand 97 assures that the parison P which is extruded at a uniform speed is gradually accommodated in the groove 11a also at substantially a uniform speed without being twisted. The uniform accommodating speed of the parison P prevents the parison P from partially swelling.

The parison P is controlled to be accommodated in the curves of the groove 11a while the parison P is held by the second guiding hand 97. Such control can be realized by making the curves near an end of the groove 11a at which the accommodation is completed or by cutting the parison P at appropriate timing into an appropriate length.

The first and the second guiding hands 57 and 97 are moved based on their respective locuses. The locus of the first guiding hand 57, which is learned from experiences, is the line that the first guiding hand 57 is required to draw in order to accommodate the parison P in the groove 11a. The locus of the second guiding hand 97 is the line that the rear end of the parison P is to draw while being accommodated. As for the rotation of the second guiding hand 97, it is generally desirable that the rotation starts immediately before the parison P is accommodated in a curve of the groove 11a so as to prevent twisting of the parison P, although the timing depends on the rotating angle.

The operation after the accommodation is completed will be explained with reference to FIGS. 15c and 15d.

Figure 15C:
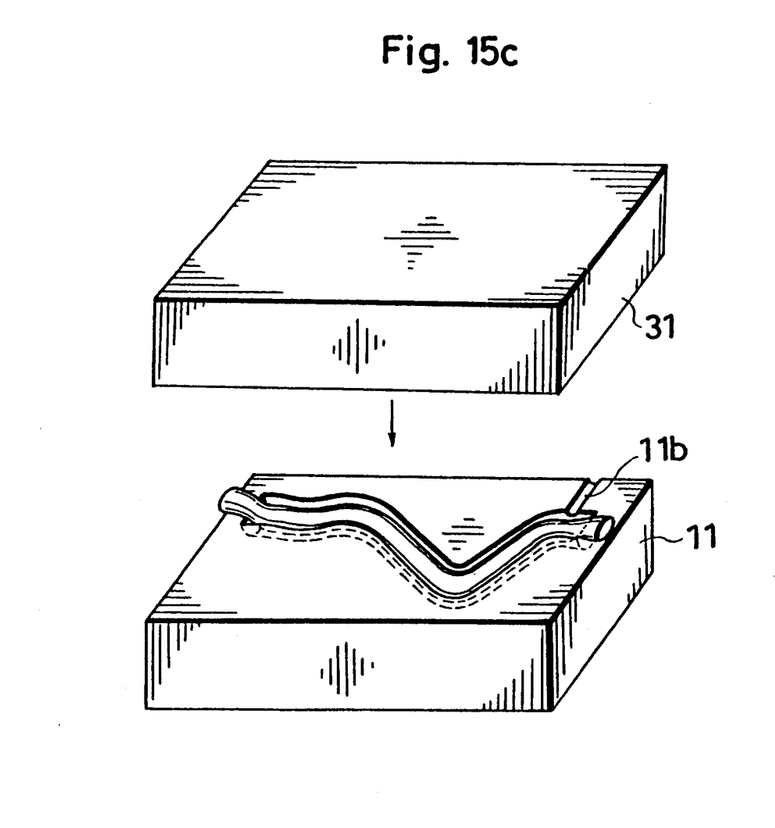
Figure 15D:
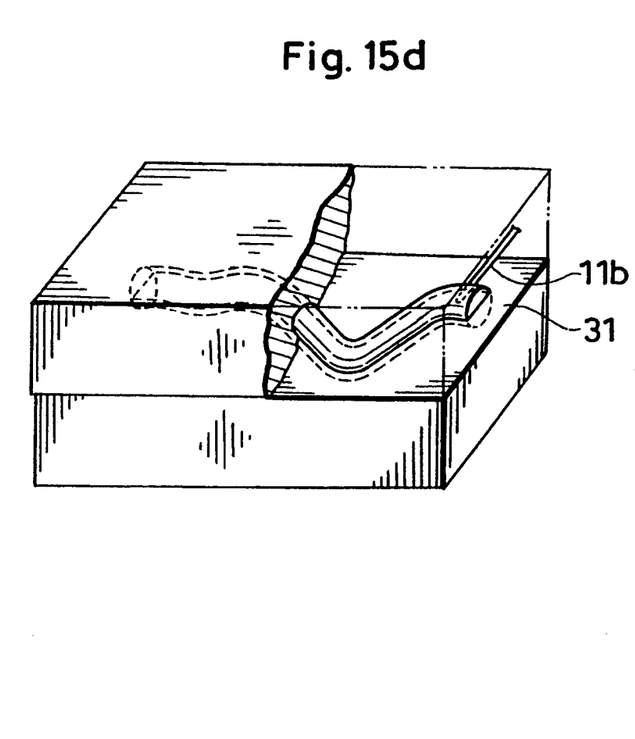

When the parison P is completely accommodated in the groove 11a, the carriage 10 is moved to the position B, where the molding device 30 is placed, and the upper molding portion 31 is lowered for molding (FIG. 15c). After the molding, the nozzle inserting device (not shown) inserts the nozzle into the parison P from a nozzle inserting hole 11b, whereby blowing a compressed air (FIG. 15d).

When the molding device 30 starts molding, the carriage 20 is moved to the position A and then the parison P is gradually accommodated in the groove 21a of the lower molding portion 21 in the same way as above. A lower portion of the parison P is accommodated by the movement of the first guiding hand 57 and of the lower molding portion 11. After the parison P is cut and held by the second guiding hand 97, the remaining portion of the parison P is accommodated mainly by the movement of the second guiding hand 97 and of the first guiding hand 57. After the parison P is released from the second guiding hand 97, the last portion of the parison P is accommodated mainly by the movement of the first guiding hand 57 alone.

Prior to the accommodation is started in the lower molding portion 21, the first guiding hand 57, which was lowered during the previous accommodation, is elevated back and if necessary is moved in the N or −N direction to be in the waiting mode below the extruding head 1. If the first guiding hand 57 has been positioned low from the start of the previous accommodation, there is no need of lowering the first guiding hand 57. Needless to say, the vertical movement of the first guiding hand 57 is not necessary in such case.

After the accommodation is completed in the lower molding portion 21, the carriage 20 is moved to the position C, where the molding device 40 molds the parison P as above, and a compressed air is inserted by the nozzle inserting device. When the molding starts, the carriage 10, which is loading the lower molding portion 11 where molding has already been completed, is moved back to the position A, where the parison P is taken out by the automatic takeout device 92 as a finished product.

The above procedure is repeated to manufacture hollow synthetic resin products in the two molding devices alternately. If the product design requires additional parts to be adhered on the parison P, the parts are put in the groove by a part inserting robot (not shown) provided in the vicinity of the position A. After the finished product is take out by the automatic takeout device 92, the parts for the next product to manufacture are placed in the groove. If the parts are to be adhered on the opposite side of the parison P, the parison P is accommodated in the groove, thereafter the parts are put on the parison P.

In the above embodiment, the parison guide 50 and the parison pinch 90 each comprise a plurality of rotatable members. However, a combination of a rotatable mechanism and a sliding mechanism or a plurality of sliding mechanisms can also be used for this invention.

Although the molding portions are moved straight in the above embodiment, thy may be placed on a rotating disc plate such as a dividing table. In this case, the parison guide 50 is moved in a direction which is perpendicular to the rotating direction of the lower molding portions.

Although the present invention has been fully described by way of an embodiment with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method manufacturing a hollow synthetic resin product, comprising the steps of: extruding a parison from an extruding head vertically downward;

moving a lower molding portion straight in a direction crossing the extruding direction of the parison in association with the extruding of the parison;

guiding the parison in a direction crossing the moving direction of the lower molding portion in accordance with a shape of a groove of the lower molding portion, and accommodating a lower portion of the parison in the groove in association with the movement of the lower molding portion as the parison is extruded;

subsequently cutting the parison into a predetermined length when the predetermined length thereof is extruded;

holding a portion of the parison to be cut by a parison pinch immediately before the parison is cut guiding the cut parison held by the parison pinch in a direction crossing the moving direction of the lower molding portion in accordance with the shape of the groove while gradually lowering the parison, and accommodating an upper portion of the parison in the groove.

2. A method of claim 1, wherein, in the step of guiding the parison held by the parison pinch; the parison pinch rotates the parison in a first direction in accordance with a curve of the groove when the parison is being accommodated in the curve and rotates the parison in a second direction opposite to the first direction after the parison passes the curve.

3. A method of manufacturing a hollow synthetic resin product, comprising the steps of:

extruding a parison from an extruding head vertically downward;

moving a lower molding portion straight in a direction crossing the extruding direction of the parison in association with the extruding of the parison;

guiding the parison in a direction crossing the moving direction of the lower molding portion in accordance with a shape of a groove of the lower molding portion, and accommodating a first portion of the parison in the groove in association with the movement of the lower molding portion as the parison is extruded;

cutting the parison into a predetermined length when the predetermined length thereof is extruded;

holding a portion of the parison to be cut by a parison pinch immediately before the parison is cut;

guiding the parison held by the parison pinch in a direction crossing the moving direction of the lower molding portion in accordance with the shape of the groove while gradually lowering the parison, and accommodating a second portion of the parison in the groove, wherein the parison pinch rotates the parison in a first direction in accordance with a curve of the groove when the parison is being accommodated in the curve and rotates the parison in a second direction opposite to the first direction after the parison passes the curve, wherein the lower molding portion is controlled to move at a high speed when the parison is being accommodated in the groove in parallel with the moving direction of the lower molding portion and to move at a low speed when the parison is being accommodated in the groove in a direction crossing the moving direction of the lower molding portion.

4. A method of claim 1, further comprising the steps of:

moving the lower molding portion to a position where the lower molding portion is opposed to an upper molding portion after the parison is completely accommodated in the groove; and molding the parison by assembling the upper molding portion and the lower molding portion and inserting a gas into the parison.

5. A method of manufacturing a hollow synthetic resin product, comprising the steps of:

moving a parison guide and a lower molding portion to substantially vertically align an extruding head, the parison guide and an end of the lower molding portion;

moving the lower molding portion substantially horizontally while extruding a parison from the extruding head, and moving the parison guide laterally in a direction crossing the substantially horizontal moving direction of the lower molding portion in accordance with a shape of a groove of the lower molding portion to accommodate a lower portion of the parison in the groove as the parison is extruded;

subsequently cutting the parison into a predetermined length when the predetermined length thereof is extruded;

holding a portion of the parison to be cut by a parison pinch immediately before the parison is cut;

moving the parison guide holding the cut portion laterally in a direction crossing the substantially horizontal moving direction of the lower molding portion in accordance with the shape of the groove while moving the lower molding portion substantially horizontally, and lowering the parison pinch gradually to accommodate an upper portion of the parison in the groove.

6. A method of claim 5, wherein, in the step of guiding the parison held by the parison pinch, the parison pinch rotates the parison in a first direction in accordance with a curve of the groove when the parison is being accommodated in the curve and rotates the parison in a second direction opposite to the first direction after the parison passes the curve.

7. A method of manufacturing a hollow synthetic resin product, comprising the steps of:

moving a parison guide and a lower molding portion to substantially vertically align an extruding head, the parison guide and an end of the lower molding portion;

moving the lower molding portion substantially horizontally while extruding a parison from the extruding head, and moving the parison guide laterally in a direction crossing the substantially horizontal moving direction of the lower molding portion in accordance with a shape of a groove of the lower molding portion to accommodate a first portion of the parison in the groove;

cutting the parison into a predetermined length when the predetermined length thereof is extruded;

holding a portion of the parison to be cut by a parison pinch immediately before the parison is cut;

moving the parison guide laterally in a direction crossing the substantially horizontal moving direction of the lower molding portion in accordance with the shape of the groove while moving the lower molding portion substantially horizontally, and lowering the parison pinch gradually to accommodate second portion of the parison in the groove, wherein the lower molding portion is controlled to move at a high speed when the parison is being accommodated in the groove in parallel with the substantially horizontal moving direction of the lower molding portion and to move at a low speed when the parison is being accommodated in the groove laterally in a direction crossing the substantially horizontal moving direction of the lower molding portion.

8. A method of claim 5, further comprising the steps of:

moving the lower molding portion to a position where the lower molding portion is opposed to an upper molding portion after the parison is completely accommodated in the groove; and molding the parison by assembling the upper molding portion and the lower molding portion and inserting a gas into the parison.

* * * * *